United States Patent
Kuckelkorn et al.

(10) Patent No.: US 7,562,655 B2
(45) Date of Patent: Jul. 21, 2009

(54) METHOD OF MAKING A GLASS-METAL JOINT, GLASS-METAL JOINT MADE THEREBY AND METHOD OF MAKING A SOLAR ENERGY TUBE COLLECTOR WITH SAID JOINT

(75) Inventors: Thomas Kuckelkorn, Weiden (DE); Guenter Bauer, Tirschenreuth (DE); Nikolaus Benz, Weiden (DE); Fritz-Dieter Doenitz, Schirmitz (DE); Reinhard Maennl, Mitterteich (DE); Matthias Mueller, Mitterteich (DE); Michael Siller, Leonberg (DE)

(73) Assignee: Schott AG, Mainz (DE)

( * ) Notice: Subject to any disclaimer, the term of this patent is extended or adjusted under 35 U.S.C. 154(b) by 504 days.

(21) Appl. No.: 11/058,549

(22) Filed: Feb. 15, 2005

(65) Prior Publication Data

US 2005/0181925 A1 Aug. 18, 2005

(30) Foreign Application Priority Data

Feb. 18, 2004 (DE) .................. 10 2004 008 559

(51) Int. Cl.
*F24J 2/00* (2006.01)
*F24J 2/46* (2006.01)
*H01J 1/62* (2006.01)
*H01J 63/04* (2006.01)
*C03C 3/085* (2006.01)
*C03C 3/087* (2006.01)

(52) U.S. Cl. .................. 126/569; 126/704; 126/712; 313/495; 501/69; 501/70

(58) Field of Classification Search .................. 501/55, 501/69, 66; 126/569, 704, 712; 313/495
See application file for complete search history.

(56) References Cited

U.S. PATENT DOCUMENTS 1,294,466 A 2/1919 Houskeeper (Continued)

FOREIGN PATENT DOCUMENTS

CN 1670446 9/2005

(Continued)

OTHER PUBLICATIONS

Kovar Technical Data. High Temp Metals information page. http://www.hightempmetals.com/techdata/hitempKovardata.php Accessed Feb. 21, 2008.*

(Continued)

*Primary Examiner*—Karl E Group
*Assistant Examiner*—Noah S Wiese
(74) *Attorney, Agent, or Firm*—Michael J. Striker

(57) ABSTRACT

The method of making a vacuum tube collector or X-ray tube, which includes a matching glass-metal joint, includes providing a glass tube (1) made of a glass with a composition, in percent by weight on the basis of oxide content, consisting of $B_2O_3$, 8-11.5; $Al_2O_3$, 5-9; $Na_2O$, 5-9; $K_2O$, 0-5; $CaO$, 0.4-1.5; balance, $SiO_2$; and bonding, preferably fusing or melting, an end portion of the glass tube (1) with a metal part (2) in order to bond or attach the glass tube to the metal part, thus forming a long-lasting glass-metal joint. The method of making the glass-metal joint is performed without using intermediary glass compositions of varying thermal conductivities. In the case of the vacuum tube collector the method can provide the basis for an automated manufacture of the vacuum tube collector.

15 Claims, 1 Drawing Sheet

U.S. PATENT DOCUMENTS

| | | | |
|---|---|---|---|
| 2,564,950 A | | 8/1951 | Black |
| 2,640,167 A | | 5/1953 | Atlee et al. |
| 4,185,365 A | * | 1/1980 | Hueschen et al. ............. 445/28 |
| 4,386,164 A | * | 5/1983 | Moser ......................... 501/66 |
| 4,523,578 A | * | 6/1985 | Mahdjuri Sabet ........... 126/677 |
| 4,870,034 A | * | 9/1989 | Kiefer ......................... 501/66 |
| 5,599,753 A | | 2/1997 | Watzke et al. |
| 6,324,870 B1 | * | 12/2001 | Chabin et al. ................. 65/154 |
| 6,794,323 B2 | | 9/2004 | Peuchert et al. |
| 2005/0189525 A1 | | 9/2005 | Kuckelkorn et al. |

FOREIGN PATENT DOCUMENTS

| | | |
|---|---|---|
| DE | 100 35 801 A1 | 2/2002 |

OTHER PUBLICATIONS

DIN17745 alloy information page. Faulenbach Werkstoffblatt. http://www.faulenbach-gmbh.de/downloads/13981.pdf. Accessed Feb. 21, 2008.*

International Standards ISO 719, Oct. 1, 1985, Second Edition, pp. 1-5.

German Standard DIN 17745, "Wrought Alloys of and Iron", Sep. 2002.

Designation: E 438-92 Standard Specification for Glasses in Laboratory Apparatus, 2001 (In English).

* cited by examiner

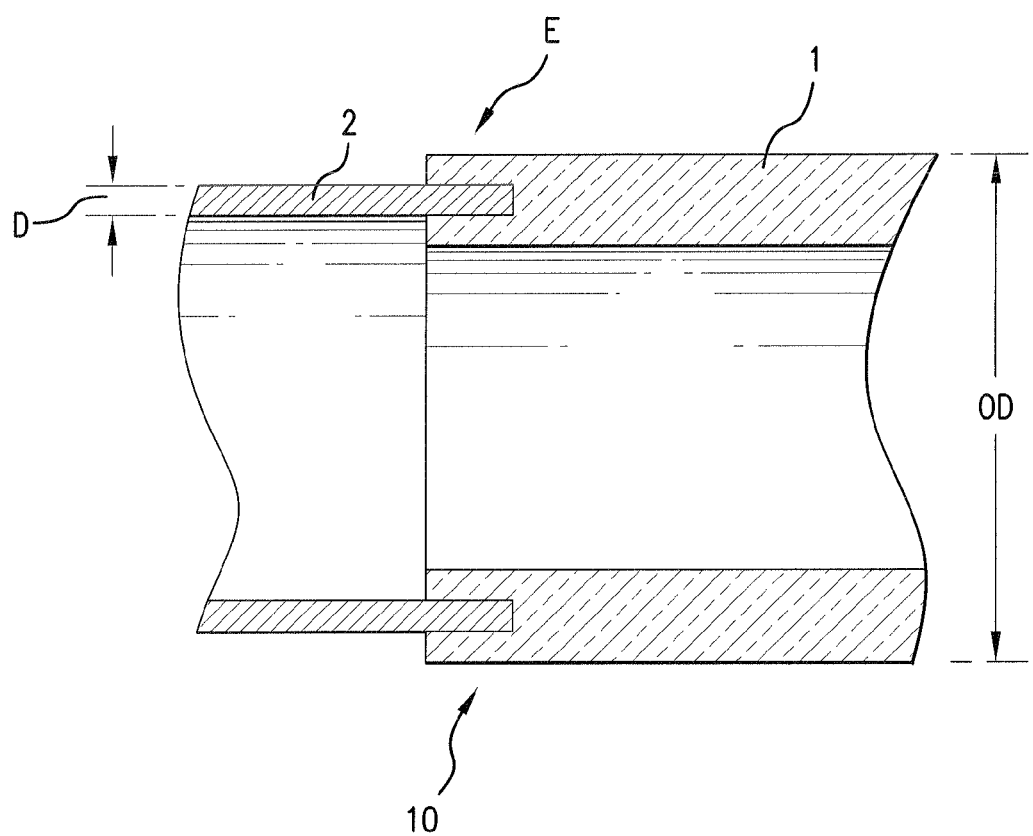

METHOD OF MAKING A GLASS-METAL JOINT, GLASS-METAL JOINT MADE THEREBY AND METHOD OF MAKING A SOLAR ENERGY TUBE COLLECTOR WITH SAID JOINT

BACKGROUND OF THE INVENTION

1. Field of the Invention

The present invention relates to a glass-metal joint or connecting device between a glass part and a metal part, to a method of making it, to a solar energy vacuum tube collector and an X-ray tube including the glass-metal joint and to methods of making them.

2. Description of the Related Art

Glass-metal joints or connecting devices are, for example, used in vacuum tube collectors and X-ray tubes. In vacuum tube collectors a vacuum-tight or vacuum-sealed glass-metal bond is required for thermal isolation between the metal absorber tube and the glass tube sleeve.

Working temperatures in collectors produced by concentrated radiation in parabolic channel solar power units reach 400° C. with great local temperature differences. The stresses due to these temperature fluctuations change continuously because of the daily rhythm and temporary cloudy phases.

Currently glass-metal joints or connecting devices, like those described in U.S. Pat. No. 1,294,466, are used in high temperature solar collectors. A very thin metal tongue with a comparatively high thermal expansion coefficient of about $15 \times 10^{-6}$ $K^{-1}$ is fused with a temperature-change-resistant glass with a considerably lower thermal expansion coefficient of about $3 \times 10^{-6}$ $K^{-1}$. The thermal stresses to be expected under thermal loads are then absorbed or picked up by plastic deformation of the metal tongue. The permanently changing stresses unavoidable in a solar collector however frequently lead to mechanical breakdown in these highly loaded regions and to unacceptably high breakage rates of the glass-metal joint of more than 4% per annum. This is a high barrier to widespread introduction of solar technology in the power-engineering field.

These glass-metal joints are so-called unmatched joints, because glass and metal having respectively different thermal expansion coefficients are used to make them.

These techniques are also used for X-ray tubes, as described in U.S. Pat. No. 6,324,870 B1.

So-called matched glass-metal joints or connecting devices are also known from X-ray tube technology. A metal with a comparatively low thermal expansion coefficient is fused or melted together with a glass with an equal or similar thermal expansion coefficient. Currently Schott 8250®, Schott 8245® and Schott 8447® are used as fusion glass. The fusion glass has the disadvantage that the resistance to water and acid is considerably lower (DIN ISO 719, HGB class 3, pp. 3 to 4) than current borosilicate glass (DURAN®, DIN ISO 719, HGB class 1, p. 1).

Better results have been obtained by fusion of a metal of about $5 \times 10^{-6}$ $K^{-1}$ with a temperature-change-resistant glass of about $3 \times 10^{-6}$ $K^{-1}$ by means of several so-called intermediary or transitional glasses with graded thermal expansion properties. This is very reliable, but it has the disadvantage that the intermediary glass materials are not corrosion resistant, an indispensable prerequisite for a solar collector. In order to make a joint to stable borosilicate glass 3.3 (DURAN®), additional intermediary glass materials are used. A known connection series of this type is: metal (e.g. NiCo2918)-Schott 8448®-Schott 8449®-Schott 8447®-Schott 8330®-Duran®.

Furthermore these intermediary glasses are not made in tubular form with outer diameters >100 mm for glass technology reasons. The multi-step melting of the intermediary glass as practiced by hand in X-ray tube technology stands in the way of an automated manufacture required for economic reasons in the case of solar collectors. Thus the techniques for connecting glass and metal parts as practiced for X-ray tubes cannot be carried over or used for high temperature solar collectors.

Moreover inclusion of intermediary glasses in the joint increases the engineering work, the disposal rate and processing costs, Furthermore manufacturing methods for glass-metal connecting devices or joints with multiple transitional glasses cannot be automated.

SUMMARY OF THE INVENTION

It is an object of the present invention to provide a glass composition for an improved matching glass-metal joint or connecting device, which simultaneously fulfills the requirements for temperature change resistance and weather resistance.

It is an another object of the present invention to provide an improved matched glass-metal joint or connecting device, which has sufficient temperature change resistance and weather resistance so that it can be used in a vacuum tube collector of a solar energy collecting apparatus or in an X-ray tube.

It is a further object of the present invention to provide an improved method for making a matched glass-metal joint or connecting device for a vacuum tube collector of a solar energy collecting apparatus, which does not use intermediary glass materials of varying thermal conductivity coefficients.

It is an additional object of the present invention to provide a method of making an improved matched glass-metal joint or connecting device for an X-ray tube.

It is another object of the present invention to provide a method of making a vacuum tube collector for a solar energy collecting apparatus including the improved matched glass-metal connecting device according to the present invention, which does not include intermediary glass materials of varying thermal conductivity coefficients so that the method can be automated.

It is a further object of the present invention to provide a method of making an X-ray tube including the improved matched glass-metal connecting device according to the present invention, which does not include intermediary glass materials of varying thermal conductivity coefficients.

This object is attained by using a glass with the following composition (in weight percent on an oxide basis):

| | |
|---|---|
| $B_2O_3$ | 8–11.5 |
| $Al_2O_3$ | 5–9 |
| $Na_2O$ | 5–9 |
| $K_2O$ | 0–5 |
| CaO | 0.4–1.5 |
| $SiO_2$ | Balance to 100% | for the glass tube used to make the glass-metal connecting device or joint, for example in a vacuum tube collector, especially in a solar energy collecting apparatus.

Another use of the glass-metal joint or connecting device made by the method according to the invention is in an X-ray tube or X-ray tube bulbs.

This sort of barium-free glass is known for preparation of drink ampoules, bottles and other pharmaceutical primary packaging means, such as syringes, cartridge ampoules, pens and test tubes. Glass tubing with a maximum outer diameter of 30 mm is the starting material for making this sort of primary packaging means.

This sort of glass has not been currently considered for use to make glass tubing for solar energy applications, which must have a diameter of more than 120 mm, and for use in glass-metal joints. This is based on the fact that it has currently not been recognized that this sort of glass combines several properties, which make it suitable for use in vacuum tube collectors.

This glass has a thermal expansion coefficient of about $5.5 \times 10^{-6}$ $K^{-1}$, or $5.5 \times 10^{-6}$ $K^{-1}$, which only varies about 10% from the thermal expansion coefficients of current metals. This glass is acid and alkali resistance (classes S1 and A2 according to DIN ISO 719). Furthermore it had low iron content, which is of considerable importance for tubular sleeves used in vacuum tube collectors. Furthermore it is especially important that the glass can be used not only to make tubing with a diameter of at most 30 mm, but also tubing with outer diameters of greater than 120 mm without any problems. This advantageous property makes the use of intermediary glasses in the joint superfluous so that an industrial automated process is possible.

A preferred composition for this sort of glass consists of (in weight percent on an oxide basis):

| | |
|---|---|
| $B_2O_3$ | 9.5 |
| $Al_2O_3$ | 6.5 |
| $Na_2O$ | 6.5 |
| $K_2O$ | 2.5 |
| CaO | 0.5 |
| $SiO_2$ | Balance to 100%. |

Preferably this glass has less than 400 ppm of Fe, especially <150 ppm of Fe. The metal content is due to naturally occurring impurities in the various ingredients, especially in $SiO_2$. The iron content of the glass can be considerably reduced by the use of specially obtained starting materials, so that its suitability for tubular sleeves in vacuum tube collectors is still further enhanced.

The term "balance to 100%" in the above glass-described compositions means that the entire remaining portion of the glass consists of $SiO_2$, except for naturally occurring impurities present in the various oxide ingredients, i.e. in the portions of the oxide ingredients, $B_2O_3$, $Al_2O_3$, $Na_2O$, $K_2O$, CaO and $SiO_2$, used to make the glass.

In an especially preferred embodiment the metal for the glass-metal joint is a metal material of group Nr. 1.3981 of DIN 17745. This metal material has the following composition (in weight %):

Ni, 28 to 30; C, up to 0.5; Co, 16 to 18, balance Fe.

It has been shown that this metal has a thermal expansion coefficient of about $5 \times 10^{-6}$ $K^{-1}$ or of $5 \times 10^{-6}$ $K^{-1}$. It forms an especially permanent, lasting bond with the glass used in the method according to the invention. In a preferred embodiment of the invention the metal part has a thickness of at least 0.5 mm to 1 mm in the region in which fusion or melting takes place. Also this feature contributes to a stable glass-metal bond, so that a long service life is guaranteed for the glass-metal joint made by the method according to the invention, even with high mechanical loads or stresses.

The glass-metal bond of the connecting device or joint can be formed by fusing or melting an end portion of the glass tube with the metal part.

BRIEF DESCRIPTION OF THE DRAWING

The objects, features and advantages of the invention will now be illustrated in more detail with the aid of the following description of the preferred embodiment, with reference to the accompanying sole FIGURE showing glass and metal tube sections connected according to the method of the present invention.

DESCRIPTION OF THE PREFERRED EMBODIMENT

The sole FIGURE shows an example of a glass-metal joint or connecting device 10 between a cylindrical glass tube 1 and a metal part (cylindrical tube) 2 made by the method according to the invention. The end edge of the cylindrical metal tube 2 with wall thickness D, e.g. D=1 mm, is directly fused without material reduction, i.e. without intervening or intermediary glass sealing material, with an end portion E of the cylindrical glass tube 1.

In preferred embodiments of the joint used in vacuum tube collectors the outer diameter OD of the glass tube is greater than 120 mm.

The disclosure in German Patent Application 10 2004 008 559.5-45 of Feb. 18, 2004 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method of joining or connecting glass and metal parts and the glass-metal joint made thereby, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A matched glass-metal connecting device consisting of a glass tube (1) and a metal part (2) fused directly to said glass tube without any intermediary glass material between said metal part and said glass tube, said glass tube (1) consisting of a glass with a composition, in percent by weight on the basis of oxide content, consisting essentially of:

| | |
|---|---|
| $B_2O_3$ | 8–11.5 |
| $Al_2O_3$ | 5–9 |
| $Na_2O$ | 5–9 |
| $K_2O$ | 0–5 |
| CaO | 0.4–1.5 |
| $SiO_2$ | balance to 100%, | wherein said composition of said glass comprises less than 400 ppm of iron; and wherein said metal part (2) is a metal tube consisting of metal material number 1.3981 of DIN 17745; and wherein said metal material has a thermal expansion coefficient that is equal to or about equal to that of said glass.

2. The glass-metal connecting device as defined in claim 1, wherein said composition of said glass is:

| | |
|---|---|
| $B_2O_3$ | 9.5 |
| $Al_2O_3$ | 6.5 |
| $Na_2O$ | 6.5 |
| $K_2O$ | 2.5 |
| CaO | 0.5 |
| $SiO_2$ | balance to 100%. |

3. The glass-metal connecting device as defined in claim 1, wherein said composition of said glass comprises less than 150 ppm of said iron.

4. The glass-metal connecting device as defined in claim 1, wherein said metal tube has a wall thickness (D) of from 0.5 mm to 1 mm and an end portion (E) of said glass tube is fused to an end portion of the metal tube having said wall thickness.

5. The glass-metal connecting device as defined in claim 4, wherein said metal tube has an outer diameter (OD) of more than 120 mm.

6. A method of making a matched glass-metal connecting device, said method comprising the steps of:
a) providing a glass tube (1) consisting of a glass, said glass having a composition, in percent by weight on the basis of oxide content, consisting essentially of:

| | |
|---|---|
| $B_2O_3$ | 8-11.5 |
| $Al_2O_3$ | 5-9 |
| $Na_2O$ | 5-9 |
| $K_2O$ | 0-5 |
| CaO | 0.4-1.5 |
| $SiO_2$ | balance to 100%, | wherein said composition of said glass comprises less than 400 ppm of iron; and
b) bonding an end portion (E) of said glass tube (1) directly with a metal part (2) without any intermediary glass material between said metal part and said glass tube, in order to bond or connect said glass tube with said metal part; and
wherein said metal part (2) is a metal tube, said metal tube consists of metal material number 1.3981 of DIN 17745; and wherein said metal material has a thermal expansion coefficient that is equal to or about equal to that of said glass.

7. The method as defined in claim 6, wherein said bonding comprises fusing or melting said end portion (E) of said glass tube.

8. The method as defined in claim 6, wherein said composition of said glass is:

| | |
|---|---|
| $B_2O_3$ | 9.5 |
| $Al_2O_3$ | 6.5 |
| $Na_2O$ | 6.5 |
| $K_2O$ | 2.5 |
| CaO | 0.5 |
| $SiO_2$ | balance to 100%. |

9. The method as defined in claim 6, wherein said composition of said glass comprises less than 150 ppm of said iron.

10. The method as defined in claim 6, wherein said metal part (2) is a metal tube with a wall thickness (D) of from 0.5 mm to 1 mm and the end portion (E) of the glass tube is fused to an end portion of the metal tube having said wall thickness.

11. A vacuum tube collector for a solar energy collecting apparatus, wherein said vacuum tube collector comprises a matched glass-metal connecting device;
wherein said matched glass-metal connecting device consists of a glass tube (1) and a metal part (2) fused directly to said glass tube without any intermediary glass material between said metal part and said glass tube, said glass tube (1) consisting of a glass with a composition, in percent by weight on the basis of oxide content, consisting essentially of:

| | |
|---|---|
| $B_2O_3$ | 8-11.5 |
| $Al_2O_3$ | 5-9 |
| $Na_2O$ | 5-9 |
| $K_2O$ | 0-5 |
| CaO | 0.4-1.5 |
| $SiO_2$ | balance to 100% |
| Iron | <400 ppm; | wherein said metal part (2) is a metal tube consisting of metal material number 1.3981 of DIN 17745; and wherein said metal material has a thermal expansion coefficient that is equal to or about equal to that of said glass.

12. The vacuum tube collector as defined in claim 11, wherein said composition of said glass is:

| | |
|---|---|
| $B_2O_3$ | 9.5 |
| $Al_2O_3$ | 6.5 |
| $Na_2O$ | 6.5 |
| $K_2O$ | 2.5 |
| CaO | 0.5 |
| $SiO_2$ | balance to 100%. |

13. The vacuum tube collector as defined in claim 12, wherein said composition of said glass comprises less than 150 ppm of said iron.

14. A matched glass-metal connecting device consisting of a glass tube (1) and a metal part (2) fused directly to said glass tube without any intermediary glass material between said metal part and said glass tube, said glass tube (1) consisting of a glass with a composition, in percent by weight on the basis of oxide content, consisting of:

| | |
|---|---|
| $B_2O_3$ | 9.5 |
| $Al_2O_3$ | 6.5 |
| $Na_2O$ | 6.5 |
| $K_2O$ | 2.5 |
| CaO | 0.5 |
| Iron | <150 ppm |
| $SiO_2$ | balance to 100%; | wherein said metal part (2) is a metal tube consisting of metal material number 1.3981 of DIN 17745; and
wherein said metal material has a thermal expansion coefficient that is equal to or about equal to that of said glass.

15. A vacuum tube collector for a solar energy collecting apparatus, wherein said vacuum tube collector comprises a matched glass-metal connecting device;

wherein said matched glass-metal connecting device consists of a glass tube (1) and a metal part (2) fused directly to said glass tube without any intermediary glass material between said metal part and said glass tube, said glass tube (1) consisting of a glass with a composition, in percent by weight on the basis of oxide content, consisting of:

| | |
|---|---|
| B$_2$O$_3$ | 9.5 |
| Al$_2$O$_3$ | 6.5 |
| Na$_2$O | 6.5 |

-continued

| | |
|---|---|
| K$_2$O | 2.5 |
| CaO | 0.5 |
| Iron | <150 ppm |
| SiO$_2$ | balance to 100%; | wherein said metal part (2) is a metal tube consisting of metal material number 1.3981 of DIN 17745; and wherein said metal material has a thermal expansion coefficient that is equal to or about equal to that of said glass.

* * * * *